United States Patent
Kamiya et al.

(10) Patent No.: US 9,999,946 B2
(45) Date of Patent: Jun. 19, 2018

(54) HIGH CORROSION-RESISTANT ALUMINUM ALLOY BRAZING SHEET, METHOD OF MANUFACTURING SUCH SHEET, AND CORROSIVE-RESISTANT HEAT EXCHANGER USING SUCH SHEET

(71) Applicants: Sadayuki Kamiya, Aichi (JP); Masaki Harada, Aichi (JP); Masafumi Saito, Aichi (JP); Taketoshi Toyoma, Aichi (JP); Makoto Ando, Tokyo (JP); Yoshiyuki Oya, Tokyo (JP); Akio Niikura, Tokyo (JP); Yoichi Kojima, Tokyo (JP)

(72) Inventors: Sadayuki Kamiya, Aichi (JP); Masaki Harada, Aichi (JP); Masafumi Saito, Aichi (JP); Taketoshi Toyoma, Aichi (JP); Makoto Ando, Tokyo (JP); Yoshiyuki Oya, Tokyo (JP); Akio Niikura, Tokyo (JP); Yoichi Kojima, Tokyo (JP)

(73) Assignee: UACJ Corporation, Tokyo (JP)

( * ) Notice: Subject to any disclaimer, the term of this patent is extended or adjusted under 35 U.S.C. 154(b) by 235 days.

(21) Appl. No.: 14/814,749

(22) Filed: Jul. 31, 2015

(65) Prior Publication Data
US 2016/0167177 A1 Jun. 16, 2016

Related U.S. Application Data

(62) Division of application No. 13/261,222, filed on Jul. 16, 2012, now Pat. No. 9,095,934.

(51) Int. Cl.
| | | |
|---|---|---|
| B32B 15/20 | (2006.01) |
| C22C 21/02 | (2006.01) |
| C22F 1/043 | (2006.01) |
| B23K 35/28 | (2006.01) |
| C23F 13/16 | (2006.01) |
| C23F 13/14 | (2006.01) |
| C22F 1/053 | (2006.01) |
| C22F 1/04 | (2006.01) |
| C22C 21/10 | (2006.01) |
| C22C 21/00 | (2006.01) |
| C21D 1/26 | (2006.01) |
| C21D 9/00 | (2006.01) |
| B23K 35/02 | (2006.01) |
| B22D 21/00 | (2006.01) |
| B22D 25/06 | (2006.01) |
| B22D 11/00 | (2006.01) |
| B23K 1/00 | (2006.01) |

(52) U.S. Cl.
CPC .......... *B23K 35/288* (2013.01); *B22D 11/003* (2013.01); *B22D 21/007* (2013.01); *B22D 25/06* (2013.01); *B23K 35/0238* (2013.01); *C21D 1/26* (2013.01); *C21D 9/0068* (2013.01); *C22C 21/00* (2013.01); *C22C 21/02* (2013.01); *C22C 21/10* (2013.01); *C22F 1/04* (2013.01); *C22F 1/043* (2013.01); *C22F 1/053* (2013.01); *C23F 13/14* (2013.01); *C23F 13/16* (2013.01)

(58) Field of Classification Search
CPC .... B22D 11/003; B22D 21/007; B22D 25/06; B23K 35/0238; B23K 35/288; C21D 1/26; C21D 9/0068; C22C 21/00; C22C 21/02; C22C 21/10; C22F 1/06; C22F 1/043; C22F 1/053; C23F 13/14; C23F 13/16
See application file for complete search history.

(56) References Cited

U.S. PATENT DOCUMENTS

2009/0165901 A1* 7/2009 Koshigoe .............. B32B 15/016
148/535

* cited by examiner

*Primary Examiner* — Lois Zheng
(74) *Attorney, Agent, or Firm* — Law Offices of John A. Parrish

(57) ABSTRACT

An aluminum alloy brazing sheet having a good brazing property that prevents diffusion of molten filler material in a core material of the aluminum alloy brazing sheet during a brazing process and which has a superior corrosion resistance to an exhaust gas condensate water after the brazing process is disclosed. A method of manufacturing of the aluminum alloy brazing sheet also is disclosed. A high corrosion-resistant heat exchanger that employs the aluminum alloy brazing sheet also is disclosed.

14 Claims, No Drawings

HIGH CORROSION-RESISTANT ALUMINUM ALLOY BRAZING SHEET, METHOD OF MANUFACTURING SUCH SHEET, AND CORROSIVE-RESISTANT HEAT EXCHANGER USING SUCH SHEET

FIELD OF THE INVENTION

The present invention relates to a high corrosion-resistant aluminum alloy brazing sheet, a method of manufacturing such a brazing sheet, and a high corrosion-resistant heat exchanger using such a brazing sheet. More specifically, the present invention relates to a high corrosion-resistant aluminum alloy brazing sheet which is suitably utilized as a passage-forming member for a high temperature compressed air and a cooling medium in a heat exchanger, and a high corrosion-resistant heat exchanger using such a brazing sheet.

BACKGROUND OF ART

Since an aluminum alloy exhibits a lightweight nature and a high thermal conductivity, and since a high corrosion-resistant feature can be realized in the aluminum alloy by a suitable treatment, it is utilized in a heat exchanger for an automobile, for example, a radiator, a condenser, an evaporator, a heater, an intercooler and so forth. For a tube member for the automobile heat exchanger, a 2-ply clad material or a 3-play clad material is used: the 2-ply clad material includes a core material composed of an Al/Mn-based alloy such as JIS3003 alloy and so forth, and an Al/Si-based filler material or an Al/Zn-based sacrificial anode material cladded on one surface of the core material; or the 3-ply clad material includes a core material composed of an Al/Mn-based alloy such as JIS3003 alloy and so forth, an Al—Si-based filler material or an Al/Zn-based sacrificial anode material cladded on one surface of the core material, and an Al/Si-based filler material cladded on the other surface of the core material. Usually, one of these clad materials is combined with and joined to a corrugated fin by carrying out a brazing process at a high temperature of about 600° C. When an inner fin is joined to an interior surface of the tube member formed of the clad material, it is necessary to give a brazing property to both the interior and exterior surfaces of the tube member.

If there is a corrosive liquid within the tube member of the heat exchanger, the tube member may be perforated due to occurrence of pitting corrosion, or a wall thickness of the tube member may be reduced due to occurrence of a uniform corrosion, so that a pressure strength of the tube member declines, resulting in breakage of the tube member. As a result, an air, an cooling water or a cooling medium circulated in the interior may be leaked. Conventionally, a corrosive liquid in the interior of the tube member is a neutral liquid or a weak acid liquid, and, in such a corrosive environment, in order to obtain both an external brazing function and a corrosion resistance, the heat exchanger is made of a brazing sheet on which a Zn-added and Al/Si-based filler material is cladded.

Incidentally, recently, in order to comply with an exhaust gas regulation in EU and USA, a system in which an exhaust gas passes through the heat exchanger has been developed to aim at improvement of mileage. When an exhaust gas passes through the heat exchanger, an interior of the tube member is cooled due to the heat exchanging so that a condensate water containing components of the exhaust gas (which is referred to as an exhaust gas condensate water hereinafter) is produced. This exhaust gas condensate water may exhibit a strong acidity, and thus the conventional brazing sheet, on which the Zn-added and Al/Si-based filler material, is insufficient in a corrosion resistance.

A corrosion rate of aluminum is considerably subjected to an influence of pH, and the lower pH, the larger the corrosion rate. According to the potential-pH diagram, when pH is less than 4, $Al^{3+}$ is stable, and thus there is general recognition that it is difficult to utilize aluminum as a corrosion-resistant material. Also, when a surface of the brazing sheet is defined by the Zn-added and Al/Si-based filler material, the corrosion rate is further increased because the Si particles on the surface of the brazing sheet serve as cathodes and because resolution of Al is accelerated due to Zn. In addition, when chloride ions exist in the solution, the passive films are broken by the chloride ions so that pitting corrosion occur therein. Since the exhaust gas condensate water contains chloride ions, it has a nature which causes the pitting corrosion. Namely, when the exhaust gas passes through the interior of the tube member of the heat exchanger, the corrosion deriving from the lowness of pH must be restrained while it is necessary to suppress occurrence and development of the pitting corrosion by giving a sacrificial protection feature to the tube member. Although the exhaust gas condensate water contains different components under various conditions, it may exhibit a strong acidity of less than pH 3, and a density of chloride ions may be more than 5 ppm which causes the pitting corrosion.

In order to solve an problem that a brazing sheet for a tube member must have a higher corrosion resistance than that of the brazing sheet on which the conventional Zn-added and Al/Si-based filler material is cladded, while giving a brazing function to both the surfaces of the tube member, Patent Documents 1-3 disclose a brazing sheet including a core material, and a material having a larger addition amount of 1.5-6.0% Si than that of the conventional case and cladded as a sacrificial anode material on the core material. Like this, when the large amount of Si is added to the sacrificial anode material, a part of the sacrificial anode material is molten during a heating process for brazing so that the molten material can serve as a filler material to braze a bare fin, and the other part of the sacrificial anode material remains as a solid part so that it is possible to obtain a higher corrosion resistance than that of the conventional Zn-added and Al/Si-based filler material. Nevertheless, it is presumed that the brazing sheets based on these techniques are used in a corrosive environment in the interior of the tube member through which a neutral liquid or a weak acid water flows like a radiator, a condenser, an evaporator and so forth, and thus a corrosive resistance of these brazing sheets is insufficient in the corrosive environment in which a liquid featuring a very low pH such as the exhaust gas condensate water exists.

In particular, in the technique disclosed in Patent Document 1, although a brazing between a sacrificial anode material and an inner fin is made possible, an addition amount of Zn is only at most 7%, and no reference is made to an idea of limitation of this addition amount. As already stated, since Zn accelerates resolution of Al, it is necessary to severely limit the addition amount of Zn before the corrosion rate can be restrained. Nevertheless, this problem is not at all recognized, and there are no reference to and no suggestion of solution of the problem that the tube member is exposed to the liquid featuring the very low pH such as the exhaust gas condensate water.

On the other hand, in the technique disclosed in Patent Document 2, in order to improve a brazing property of a surface of the sacrificial anode material, it contains Si particles having a size of 0.1-1.0 μm at a number density of 15,000-40,000/mm². As already stated, the Si particles serve as the cathode in a corrosion reaction so that the corrosion rate is increased. The Si particles having the size of 0.1-1.0 μm are molten during a heating process for brazing so that the molten Si particles serve as the filler material, and thus the corrosion rate of the not molten remaining sacrificial anode material cannot be increased. Nevertheless, the Si particles having a size of more than 1.0 μm still exist in the remaining sacrificial anode material after the heating process for brazing, resulting in increase of the corrosion rate. Therefore, it is necessary to limit the number density of Si particles having the size of 1.0 μm, but this matter is not at all considered in the technique of Patent Document 2. Further, no reference is made to a manufacturing method for obtaining a number density of Si particles having a given size.

In Patent Document 3, although a size of Si particles and a number density of Si particles are described in detail, these descriptions are merely directed to a distribution of fine particles, and there are no reference to and no suggestion of a limitation of a number density of large Si particles having the size of 1.0 μm.

PATENT DOCUMENTS

[Patent Document 1]: JP-2008-188616 A
[Patent Document 2]: JP-2000-309837 A
[Patent Document 3]: JP-2004-156108 A

SUMMARY OF THE INVENTION

Problems to be Resolved by the Invention

As stated above, for example, when an exhaust gas of an automobile passes through an interior of a tube member of a heat exchanger, corrosion deriving from lowness of pH must be restrained while it is necessary to suppress occurrence and development of pitting corrosion by giving a sacrificial protection feature to the tube member. In the conventional techniques, it is difficult to give a corrosion resistance to the tube member so that it can be endured in such corrosive environment.

The present invention has be attained to resolve the aforesaid problems, and aims at providing an aluminum alloy brazing sheet, featuring a good brazing property that prevents diffusion of molten filler material in a core material of the aluminum alloy brazing sheet during a brazing process and exhibiting a superior corrosion resistance to an exhaust gas condensate water after the brazing process, which can be especially utilized suitably as a passage-forming member for an automobile heat exchanger, and a method of manufacturing the aluminum alloy brazing sheet.

Means for Resolving the Problems

According to researches of the inventors concerning the aforesaid problems, it has been found that the problems can be resolved by utilizing a sacrificial anode material which is composed of specific alloy components wherein a content of Si, a content of Zn and a thickness of clad satisfy a specific relational formula, and which is defined as a clad material having a desirable existence density of Si particles, resulting in achievement of the present invention.

Concretely, in claim 1, the present invention is claimed as a high corrosion-resistant aluminum alloy brazing sheet comprising: a core material composed of an aluminum alloy; a sacrificial anode material cladded on one surface of the core material; and a filler material composed of an Al/Si-based alloy and cladded on another surface of the core material, characterized in that the sacrificial anode material is composed of an aluminum alloy which contains Si falling within a range of 2.5-7.0 mass %, Zn falling within a range of 1.0-5.5 mass %, Fe falling within a range of 0.05-1.0 mass %, and which is composed of the balance Al and the inevitable impurities, and that a clad thickness of the sacrificial anode material falling within a range of 25-80 μm.

In claim 2, the present invention is claimed as a high corrosion-resistant aluminum alloy brazing sheet comprising: a core material composed of an aluminum alloy; and respective sacrificial anode materials cladded on both surfaces of the core material, characterized in that each of the sacrificial anode materials is composed of an aluminum alloy which contains Si falling within a range of 2.5-7.0 mass %, Zn falling within a range of 1.0-5.5 mass %, Fe falling within a range of 0.05-1.0 mass %, and which is composed of the balance Al and the inevitable impurities, and that a clad thickness of the sacrificial anode material falling within a range of 25-80 μm.

In claim 3, the present invention features in the fact that the sacrificial anode material is composed of the aluminum alloy which further contains at least one element selected from the group consisting of Ti falling within a range of 0.05-0.3 mass %, Zr falling within a range of 0.05-0.3 mass %, Cr falling within a range of 0.05-0.3 mass %, and V falling within a range of 0.05-0.3 mass %.

In claim 4, the present invention features in the fact that a value of X which is determined by the following formula (1) is at most 150:

$$X = (1.1 - 0.1 \times Sic) \times Znc \times T \quad (1)$$

herein: Sic (mass %) is a content of Si; Znc (mass %) is a content of Zn; and T (μm) is a clad thickness of the sacrificial anode material.

In claim 5, the present invention features in the fact that an existence density of Si particles having a projected area diameter of at least 1.0 μm is at most 5,000/mm² in a matrix of the sacrificial anode material, and that an existence density of Si particles having a projected area diameter of at least 0.5 μm is at most 500/mm² in the matrix of the sacrificial anode material.

In claim 6, the present invention features in the fact that an average crystallized grain diameter measured thickwise in the sacrificial anode material is at least 80% of the clad thickness of the sacrificial anode material after the high corrosion-resistant aluminum alloy brazing sheet is heated and brazed.

In claim 7, the present invention features in the fact that the high corrosion-resistant aluminum alloy brazing sheet is utilized as a tube member of a heat exchanger into which an exhaust gas of an automobile flows.

In claim 8, the present invention is claimed as a high corrosion-resistant heat exchanger characterized in that a high corrosion-resistant aluminum alloy brazing sheet as set forth in claim 7 is utilized to form the tube member so that an inner surface of the tube member is defined by the sacrificial anode material, that a bare fin is arranged over the inner surface of the tube member so as to form an inner fin, and that the sacrificial anode material and the bare fin is brazed and joined, resulting in production of the high corrosion-resistant heat exchanger.

In claim 9, the present invention is claimed as a method of manufacturing a high corrosion-resistant aluminum alloy brazing sheet as set forth in any one of claims 1 to 7, characterized in that a production process for producing the sacrificial anode material comprises a casting process, a heating process and a hot rolling process, wherein a cooling rate V (° C./s) for an ingot of the sacrificial anode material a content Sic of Si satisfy the following formula (2) in the casting process:

$$V \leq Sic/5 \quad (2);$$

wherein the ingot of the sacrificial anode material is heated and held at a temperature falling within a range of 300-500° C. over a time period falling within a range of 1-5 hrs in the heating process after the casting process, and wherein, in the hot rolling process after the heating process, a temperature of the sacrificial anode material is at most 350° C. at an end of the hot rolling process.

In claim 10, the present invention is claimed as a method of manufacturing a high corrosion-resistant aluminum alloy brazing sheet as set forth in any one of claims 1 to 7, characterized by: a combining process in which a sacrificial anode material manufactured by the method as set forth in claim 9, a core material composed of an aluminum alloy, and a filler material composed of an Al/Si-based alloy are combined with each other to thereby produce a composite material; a heating and holding process in which the composite material is heated and held at a temperature falling within 400-500° C. over a time period falling within a range of 1-10 hr after the combining process; and a hot rolling process in which a rolling time for rolling the composite material is at most 40 min after the heating and holding process, and in which a temperature of the composite material is at most 300° C. at an end of the hot rolling process.

Effects of the Invention

According to the present invention, there is provided a high corrosion-resistant aluminum alloy brazing sheet having a sufficient corrosion resistance in a corrosion environment in which, for example, an exhaust of an automobile passes through an interior of a tube member of a heat exchanger. With the high corrosion-resistant aluminum alloy brazing sheet according to the present invention, in a state in which a heating process for brazing is completed, not only can uniform corrosion deriving from lowness of pH in a corrosion liquid be restrained, but also it is possible to suppress occurrence and development of pitting corrosion deriving from existence of chloride ions in the corrosion liquid. Also, this brazing sheet exhibits superior brazing properties such as a fin join percentage, an erosion resistance and so forth; features a lightweight nature and a superior thermal conductivity for a heat exchanger of, for example, an automobile; and thus can be suitably utilized as a tube member of the heat exchanger for the automobile. Further, by combining the tube member formed of the aluminum alloy brazing sheet according to the present invention with an inner fin formed of a fin material composed of specific alloy components, it is possible to manufacture a heat exchanger which can exercise a high corrosion resistance to an exhaust gas condensate water.

EMBODIMENT FOR CARRYING OUT THE INVENTION

Next, a preferable embodiment of a high corrosion-resistant aluminum alloy brazing sheet according to the present invention and a method of manufacturing such a brazing sheet will now be explained in detail.

A: Corrosive Environment of Heat Exchanger

First, a corrosive environment in which merits of the present invention can be exercised at the most will be explained. When a high corrosion-resistant aluminum alloy brazing sheet according to the present invention is utilized in a heat exchanger in which an exhaust gas of an automobile passes through an interior of a tube member, the merits of the present invention can be exercised in the most. As stated hereinbefore, when pH is low, there is a large amount of H+ in a liquid so that a corrosion rate is increased. When a surface of the brazing sheet is defined by a Zn-added and Al/Si-based filler material, the corrosion rate is further increased because the Si particles on the brazing sheet surface serve as cathodes and because resolution of Al is accelerated due to Zn. The brazing sheet according to the present invention can resolve a particular problem concerning the exhaust gas condensate water. When the brazing sheet is utilized as the tube member in a heat exchanger in which an exhaust gas of an automobile passes through the interior of the tube member, the brazing sheet according to the present invention restrains the corrosion, and the merits of the present invention can be exercised at the most. When the brazing sheet is utilized as the tube member in a heat exchanger in which an exhaust gas of an automobile does not pass through the interior of the tube member, the corrosion rate is not so large so that the merits of the present invention may not be effectively exercised.

Also, as already stated, when chloride ions exist in a solution, passive films are broken by the chloride ions so that pitting corrosion occurs. When the brazing sheet is utilized as the tube member in a heat exchanger in which an exhaust gas of an automobile passes through the interior of the tube member, an exhaust gas condensate water produced in the interior of the tube member contains chloride ions, and thus it has a nature which causes the pitting corrosion. Accordingly, the brazing sheet according to the present invention suppress occurrence and development of the pitting corrosion by giving a sacrificial protection feature to the tube member, and thus the merits of the present invention can exercised at the most. When the brazing sheet is utilized as the tube member in a heat exchanger in which an exhaust gas of an automobile does not pass through the interior of the tube member, there may be a case where the corrosion environment does not have a nature which causes the pitting corrosion, and thus the merits of the present invention may not be effectively exercised. Note, in the corrosion environment in which the merits of the present invention can be exercised at the most, preferably, pH is less than pH3, and a density of chloride ions is more than 5 ppm.

Next, a sacrificial anode material, a core material and a filler material forming an aluminum alloy brazing sheet according to the present invention will be explained.

B: Sacrificial Anode Material

B-1: Si

A melting point of the sacrificial anode material falls by addition of Si so that the sacrificial anode material may take on a liquid phase, to thereby make a brazing process possible. A content of Si falls within a range of 2.5-7.0 mass % (which is merely abbreviated to % hereinafter). When the Si content is less than 2.5 mass %, an amount of the liquid phase is small so that an external brazing function cannot be sufficiently obtained. On the other hand, when the Si content exceeds 7.0%, an amount of the liquid phase produced during a heating process for brazing is too large so that the other part of the sacrificial anode material which remains as a solid phase part becomes small, resulting in deterioration in a corrosion resistance. Preferably, the Si content falls within a range of 3.0-6.0%.

B-2: Zn

Zn can give a lower potential to the sacrificial anode material to thereby establish a potential difference between the sacrificial anode material and the core material whereby it is possible to improve a corrosion resistance by the sacrificial anode effect. A content of Zn falls within a range of 1.0-5.5%. When the Zn content is less than 1.0%, the improvement of the corrosion resistance by the sacrificial anode effect is insufficient. On the other hand, when the Zn content exceeds 5.5%, a corrosion rate is accelerated so that the sacrificial anode material prematurely disappears, resulting in deterioration in a corrosion resistance.

B-3: Fe

Fe easily produces Al/Fe-based compounds and Al/Fe/Si-based compounds, these compounds serve as cathodes in aluminum, resulting in deterioration in a corrosion resistance. A content of Fe falls within a range of 0.05-1.0%. When the Fe content is less than 0.05%, it is necessary to use a high-purity aluminum metal, resulting in an increase of a manufacturing cost. On the other hand, when the Fe content exceeds 1.0%, a cathode reaction is activated, resulting in an insufficient corrosion resistance. Preferably, the Fe content falls within a range of 0.1-0.5%.

B-4: Ti

Ti improves not only a strength by a solid solution strengthening effect but also a corrosion resistance. It is preferable that a content of Ti falls within a range of 0.05-0.3%. When the Ti content is less than 0.05%, there may be a case where the aforesaid merits cannot be obtained. When the Ti content exceeds 0.3%, large intermetallic compounds are easily formed so that a plastic-workability may deteriorate. More preferably, the Ti content falls within a range of 0.1-0.2%.

B-5: Zr

Zr improves a strength by a solid solution strengthening effect, and causes separation of Al/Zr-based intermetallic compounds, resulting in enlargement of crystallized grains after a brazing process. It is preferable that a content of Zr falls within a range of 0.05-0.3%. When the Zr content is less than 0.05%, there may be a case where the aforesaid merits cannot be obtained. When the Zr content exceeds 0.3%, large intermetallic compounds are easily formed so that a plastic-workability may deteriorate. More preferably, the Zr content falls within a range of 0.1-0.2%.

B-6: Cr

Cr improves a strength by a solid solution strengthening effect, and causes separation of Al/Cr-based intermetallic compounds, resulting in enlargement of crystallized grains after a brazing process. It is preferable that a content of Cr falls within a range of 0.05-0.3%. When the Cr content is less than 0.05%, there may be a case where the aforesaid merits cannot be obtained. When the Cr content exceeds 0.3%, large intermetallic compounds are easily formed so that a plastic-workability may deteriorate. More preferably, the Zr content falls within a range of 0.1-0.2%.

B-7: V

V improves not only a strength by a solid solution strengthening effect but also a corrosion resistance. It is preferable that a content of V falls within a range of 0.05-0.3%. When the V content is less than 0.05%, there may be a case where the aforesaid merits cannot be obtained. When the V content exceeds 0.3%, large intermetallic compounds are easily formed so that a plastic-workability may deteriorate. More preferably, the V content falls within a range of 0.1-0.2%.

At least one of these elements Ti, Zr, Cr and V may be added to the sacrificial anode material, if necessary.

B-8: Relationship Between Si Content, Zr Content and Clad Thickness

Further, in light of the corrosion resistance, it is preferable that not only the Si content Sic (mass %), the Zn content Znc (mass) and the clad thickness T (μm) are regulated by the respective ranges, but also these quantities satisfy the above-mentioned relational formula (1). In the relational formula (1), X represents the total amount of Zn which remains as a solid phase in the sacrificial anode material without melting during the heating process for brazing.

In particular, a rate at which the sacrificial anode material remains as a solid phase during the heating process for brazing is determined by the Si content Sic (mass %), and is represented by (1.1-0.1Sic), and a value of X which is obtained by multiplying (1.1-0.1Sic) by the Zn content Znc (mass %) and the clad thickness T (μm) is defined as an index representing the total amount of Zn which remains as the solid phase in the sacrificial anode material. As a result of the intimate experiments and researches of the inventors, when the value of X was at most 150, it has been found that an especially excellent corrosion resistance could be obtained in an environment including the exhaust gas condensate water. In other words, when the total amount of Zn remaining as the solid phase in the sacrificial anode material did not exceed a given constant standard value, the especially excellent corrosion resistance could be obtained. Note, more preferably, the value of X was at most 140. The larger the value of X, the larger the corrosion rate. Nevertheless, since the corrosion rate of aluminum in an acid area is represented by an negative exponential function with respect to pH, the lower pH, the larger a difference between corrosion rates based on different values of X. Accordingly, the lower pH of a corrosion liquid to which aluminum is exposed, the more ascendancy of the present invention is exercised. When the value of X exceeds 150, the corrosion rate is large, and thus a sufficient corrosion resistance cannot be exercised.

B-9: Clad Thickness of Sacrificial Anode Material

A clad thickness of the sacrificial anode material constituting the aluminum alloy brazing sheet according to the present invention is regulated so as to fall within a range of 25-80 μm, and this reason will be explained. Not only the sacrificial anode material used in the present invention is provided for a sacrificial corrosion resistance, but also a part of the sacrificial anode material melts and serves as a filler material during a heating process for brazing, whereby a bare fin can be brazed to the sacrificial anode material. When the clad thickness of the sacrificial anode material is less than 25 μm, the Si component of the sacrificial anode material may be diffused from the sacrificial anode material into a core material during the heating process for brazing. As a result, the remaining amount of Si for the brazing process becomes small, and thus it is difficult to save an amount of molten liquid phase for the brazing process. On the other hand, when the clad thickness of the sacrificial anode material exceeds 80 μm, an excessive amount of fluid filler material is produced to thereby cause erosion in which a fin is eroded by the filler material.

B-10: Metal Texture Before Blazing

Also, with respect to a metal texture of the sacrificial anode material before blazing, an existence density of Si particles having a projected area diameter of at least 1.0 μm is significant in a matrix of the sacrificial anode material. That is to say, it is preferable that the existence density of Si particles having the projected area diameter of at least 1.0 μm is at most 5,000/mm$^2$ in the matrix of the sacrificial anode material. As already stated, the Si particles serve as a cathode in a corrosion reaction so that a corrosion rate is increased. Since the Si particles having the projected area diameter of less than 1.0 μm are molten during a heating process for brazing so that the molten material can serve as a filler material, the corrosion rate of the not molten remaining sacrificial anode material cannot be increased. On the other hand, since the Si particles having the projected area diameter of at least 1.0 μm still exist in the remaining sacrificial anode material after the heating process for brazing, resulting in increase of the corrosion rate. Since the corrosion rate of aluminum in an acid area is represented by an negative exponential function with respect to pH, the lower pH, the larger a difference between corrosion rates based on a difference between densities of the Si particles having the projected area diameter of at least 1.0 μm. Accordingly, the lower pH of a corrosion liquid to which aluminum is exposed, the more ascendancy of the present invention is exercised. By making the existence density of the Si particles having the projected area diameter of at least 1.0 μm to be at most 5,000/mm$^2$, the corrosion rate of the sacrificial anode material is restrained so that the sufficient corrosion resistance is obtained. When the existence density of the Si particles having the projected area diameter of at least 1.0 μm is more than 5,000/mm$^2$, the corrosion rate of the sacrificial anode material is increased so that the sufficient corrosion resistance cannot be obtained. Note that it is more preferably that the existence density of the Si particles having the projected area diameter of at least 1.0 μm is at most 3,000/mm$^2$.

Further, in the aluminum alloy brazing sheet according to the present invention, after the sacrificial anode material is subjected to the heating process for brazing, it is preferable that a crystallized grain diameter of the sacrificial anode material is large in light of the corrosion resistance. For this reason, in the metal texture of the sacrificial anode material before blazing, it is preferable that the existence density of the Si particles having the projected area diameter of at least 5.0 μm is at most 500/mm$^2$ in the matrix of the sacrificial anode material. Since the Si particles having the projected area diameter of at least 5.0 μm serves nucleuses for recrystallization during the heating process for brazing, when the density of these Si particles is large, the crystallized grain diameter becomes relatively fine after the brazing process. When the density of the Si particles having the projected area diameter of at least 5.0 μm exceeds 500/mm$^2$, the crystallized grain diameter of the sacrificial anode material becomes smaller than 80% of the clad thickness after the brazing process. More preferably, the density of the Si particles having the projected area diameter of at least 5.0 μm is at most 400/mm$^2$. In view of the above-mentioned viewpoint, although there is not the lower limit on the density of the Si particles having the projected area diameter of at least 5.0 μm, it is difficult to make the density to be less than 10/mm$^2$ with respect to the composition of the sacrificial anode material which is regulated in the brazing sheet according to the present invention.

B-11: Metal Issue after Heating Process for Brazing

In the aluminum alloy brazing sheet according to the present invention, after the heating process for brazing, it is possible that an average crystallized grain diameter measured thickwise in the sacrificial anode material is at least 80% of the clad thickness of the sacrificial anode material after the brazing sheet is heated and brazed. When the brazing sheet according to the present invention is brazed, the molten filler materials are produced in the grain boundaries. Thus, when the brazing sheet is exposed to a corrosion environment, to thereby cause local corrosion in the grain boundaries. When the average crystallized grain diameter measured thickwise in the sacrificial anode material is at least 80% of the clad thickness of the sacrificial anode material after the brazing process, since grain boundaries, which exist in a middle of the sacrificial anode material in thickwise or a surface between the sacrificial anode material and the core material, are small, it is possible to restrain elimination of the crystallized grains based on the grain boundary corrosion. Accordingly, it takes a long time until the sacrificial anode material disappears due to the corrosion whereby a sufficient corrosion resistance can be obtained. When the average crystallized grain diameter measured thickwise in the sacrificial anode material is less than 80% of the clad thickness of the sacrificial anode material after the brazing process, since the grain boundaries, which exist in the middle of the sacrificial anode material in thickwise or the surface between the sacrificial anode material and the core material, are large, the elimination of the crystallized grains based on the grain boundary corrosion easily occur. Accordingly, the sacrificial anode material prematurely disappears whereby a sufficient corrosion resistance cannot be obtained. Note, more preferably, the average crystallized grain diameter is at least 90% of the clad thickness of the sacrificial anode material after the brazing process.

C: Core Material

In the present invention, for an aluminum alloy of which the core material is formed, JIS 3000-based alloy, for example, JIS 3003 alloy such as an Al/Mn-based alloy and so forth can be suitably used. Main components will be explained below.

C-1: Si

Si produces Al/Mn/Si-based intermetallic compounds together with Mn, and improves a strength of the core material by either a dispersion hardening effect or a solid solution strengthening effect obtained due to solid solution of Si in the matrix phase of aluminum. A content of Si falls within a range of 0.1-1.2%. When the Si content is less than 0.1%, the aforesaid effect cannot be sufficiently exercised. When the Si content exceeds 1.2%, a melting point of the core material declines, and thus a possibility of causing melt of the core material is increased. Preferably, the Si content falls within a range of 0.1-1.0%.

C-2: Fe

Fe easily produces intermetallic compounds having a size which can serve as nucleuses for recrystallization, and makes a crystallized grain diameter large after a brazing process, thereby restraining diffusion of a filler material into the core material. A content of Fe falls within a range of 0.05-1.0%. When the Fe content is less than 0.05%, it is necessary to use a high-purity aluminum metal, resulting in an increase of a manufacturing cost. When the Fe content exceeds 1.0%, the crystallized grain diameter becomes fine after the brazing process, and thus the diffusion of the filler material may be caused. Preferably, the Fe content falls within a range of 0.1-0.5%.

C-3: Cu

Cu improves a strength of the core material by a solid solution strengthening effect. A content of Cu falls within a range of 0.05-1.2%. When the Cu content is less than 0.05%, the aforesaid effect cannot be sufficiently exercised. When the Cu content exceeds 1.2%, a possibility of causing a crack of the aluminum alloy during a casting process is increased. Preferably, the Cu content falls within a range of 0.3-1.0%.

C-4: Mn

Mn produces Al/Mn/Si-based intermetallic compounds together with Si, and improves a strength of the intermetallic compound by either a dispersion hardening effect or a solid solution strengthening effect obtained due to solid solution of Mn in the matrix phase of aluminum. A content of Mn falls within a range of 0.6-1.8%. When the Mn content is less than 0.6%, the aforesaid effect cannot be sufficiently exercised. When the Mn content exceeds 1.8%, large intermetallic compounds are easily produced during a casting process so that a plastic-workability may deteriorate. Preferably, the Mn content falls within a range of 0.8-1.6%.

C-5: Mg

Mg improves a strength of the core material by separation of $Mg_2Si$. It is preferable that a content of Mg falls within a range of 0.05-0.5%. When the Mg content is less than 0.05%, there may be a case where the aforesaid effect cannot be sufficiently exercised. When the Mg content exceeds 0.5%, there may be a case where it is difficult to carry out a brazing process. More preferably, the Mg content falls within a range of 0.15-0.4%.

C-6: Ti

Ti improves a strength of the core material by a solid solution strengthening effect. It is preferable that a content of Ti falls within a range of 0.05-0.3%. When the Ti content is less than 0.05%, the aforesaid effect cannot be sufficiently exercised. When the Ti content exceeds 0.3%, large intermetallic compounds are easily produced so that there may be a case where a plastic-workability deteriorates. More preferably, the Ti content falls within a range of 0.1-0.2%.

C-7: Zr

Zr not only improves a strength of the core material by a solid solution strengthening effect, but also separates Al/Zr-based compounds, resulting in enlargement of crystallized grains after a brazing process. It is preferable that a content of Zr falls within a range of 0.05-0.3%. When the Zr content is less than 0.05%, there may be a case where the aforesaid effect cannot be obtained. When the Zr content exceeds 0.3%, large intermetallic compounds are easily produced so that there may be a case where a plastic-workability deteriorates. More preferably, the Zr content falls within a range of 0.1-0.2%.

C-8: Cr

Cr not only improves a strength of the core material by a solid solution strengthening effect, but also separates Al/Cr-based compounds, resulting in enlargement of crystallized grains after a brazing process. It is preferable that a content of Cr falls within a range of 0.05-0.3%. When the Cr content is less than 0.05%, there may be a case where the aforesaid effect cannot be obtained. When the Cr content exceeds 0.3%, large intermetallic compounds are easily produced so that there may be a case where a plastic-workability deteriorates. More preferably, the Cr content falls within a range of 0.1-0.2%.

C-9: V

V improves not only a strength of the core material by a solid solution strengthening effect, but also a corrosion resistance. It is preferable that a content of V falls within a range of 0.05-0.3%. When the V content is less than 0.05%, there may be a case where the aforesaid effect cannot be obtained. When the V content exceeds 0.3%, large intermetallic compounds are easily produced so that there may be a case where a plastic-workability deteriorates. More preferably, the V content falls within a range of 0.1-0.2%.

For the core material, an aluminum alloy is suitably used based on the above-mentioned components, which contains Si falling within a range of 0.1-1.2 mass %, Fe falling within a range of 0.05-1.0 mass %, Cu falling within a range of 0.05-1.2 mass %, and Mn falling within a range of 0.6-1.8 mass %, and which is composed of the balance Al and the inevitable impurities. Also, in addition to these components, the aluminum alloy may further contain at least one element selected from the group consisting of Mg falling within a range of 0.05-0.5 mass %, Ti falling within a range of 0.05-0.3 mass %, Zr falling within a range of 0.05-0.3 mass %, Cr falling within a range of 0.05-0.3 mass %, and V falling within a range of 0.05-0.3 mass %.

D: Filler Material

For the filler material, it is possible to utilize an Al/Si-based alloy which is ordinarily used. An composition of the alloy is not especially limited. For example, JIS 4343 alloy, JIS 4045 alloy or JIS 4047 alloy (Al falling within a range of 7-13 mass %) can be suitably utilized.

E: Method of Manufacturing High Corrosion-Resistant Aluminum Alloy Brazing Sheet E-1: Production of Core Material The core material, which is used in the aluminum alloy brazing sheet according to the present invention, is cast by a semi-continuous casting process. The cast product is subjected to a homogenization process at a temperature falling within a range of 400-620° C. over a time period falling within a range of 1-20 hrs, if necessary, and then a thickness of the cast product is regulated by a machining process, resulting in production of an ingot for the core material.

E-2: Production of Sacrificial Anode Material

A manufacturing method of the sacrificial anode material used in the present invention includes a semi-continuous casting process of producing an ingot, a heating process of the ingot so obtained, and a hot rolling process of rolling the heated ingot. In order to further improve a corrosion resistance of the sacrificial anode material, it is possible that an existence density of Si particles having a projected area diameter of at least 1.0 μm is at most 5,000/mm² in a matrix of the sacrificial anode material, and that an existence density of Si particles having a projected area diameter of at least 0.5 μm is at most 500/mm² in the matrix of the sacrificial anode material, whereby of is possible to prevent enlargement of the Si particles. For this end, it is necessary to control a cooling rage of the ingot during the casting process of the sacrificial anode material, both a heating temperature and a heating time of the ingot during the heating process after the casting process, and a temperature of the ingot at the end of the hot rolling process after the heating process.

As the cooling rate of the ingot during the casting process of the sacrificial anode material becomes larger, the large Si particles cannot be easily produced. The necessary cooling rate depends on an amount of Si added to the sacrificial anode material. The inventors has carried out the intimate experiments and researches on the relationship among both the size and the density of the Si particles, the cooling rate V (° C./s) during the casting process of the sacrificial anode material, and the Si content of the sacrificial anode material. As a result, it has been found that a more desirable distribution of Si could be obtained when the cooling rate V and the content Sic satisfy the above-mentioned formula (2). The cooling rate of the sacrificial anode material is controlled so as to be equal to or exceed a given constant standard value, which means that the standard value is more increased as the Si content becomes larger. Note, the cooling rate during the casting process is defined as one at which coagulation is caused in a central region of the slab. Also, note, it is further preferable that the cooling rate (V) of the sacrificial anode material during the casting process and the Si content Sic added to the sacrificial anode material satisfy the following formula (3):

$$V \leq Sic/4 \qquad (3)$$

The ingot for the sacrificial anode material, which is obtained by the aforesaid casting process, is rolled in the hot rolling process until a predetermined thickness is given to the ingot. According to the present invention, in the heating process before the hot rolling process, it is preferable that the ingot has a temperature falling within a range of 300-500° C. and a heating/holding time falling within a range of 1-10 hrs. When the temperature of the ingot exceeds 500° C. or when the heating/holding time exceeds 10 hrs, the Si particles are enlarged in the sacrificial anode material so that it is impossible to obtain more suitable distribution of the Si particles, resulting in deterioration in the corrosion resistance. On the other hand, when the temperature of the ingot is less than 300° C., since the ingot has a large resistance to deformation during the hot rolling process, there may be a case where it is difficult to carry out the hot rolling process. Also, when the heating/holding time is less than 1 hr, there may be a case where the temperature of the ingot is not equalized.

The ingot for the sacrificial anode material is subjected to the hot rolling process after the heating process. According to the present invention, it is possible that the temperature of the ingot is at most 350° C. at the end of the hot rolling process. When the temperature of the ingot exceeds 350° C. at the end of the hot rolling process, the Si particles are enlarged in the sacrificial anode material so that it is impossible to obtain more suitable distribution of the Si particles, resulting in deterioration in the corrosion resistance. Note, although a thickness of the sacrificial anode material after the hot rolling process is determined by a target clad ratio and a thickness of the ingot for the core material, it is ordinarily on the order of 1-100 mm.

E-3: Production of Filler Material

Although the filler material is also produced by a casting process and a hot rolling process, a specific control is unnecessary in the production of the filler material. Ordinarily, the filler material is cast at a cooling rate of at least 0.3° C./s. Then, after the filler material is heated at at most 500° C. over a time period of at least 1 hr, it is subjected to the hot rolling process.

E-4: Production of Composite Material

In manufacturing the aluminum alloy brazing sheet according to the present invention, the core material, the sacrificial anode material and the filler material, which are produced as mentioned above, are utilized, and a manufacturing method includes: a combining process in which the core material, the sacrificial anode material and the filler material are combined with each other so that the sacrificial anode material and the filler material are applied to respective surfaces of the core material, or in which the core material and the sacrificial anode materials are combined with each other so that the sacrificial material are applied to the respective surfaces of the core material, resulting in production of a composite material; a heating process in which an ingot defined as the composite material is heated; and a combining/material hot rolling process in which the heated composite is rolled. In the production of the composite material, it is preferable that an existence density of Si particles having a projected area diameter of at least 1.0 μm is at most 5,000/mm² in a matrix of the sacrificial anode material. This is because the Si particles are prevented from being enlarged, resulting in improvement of a corrosion resistance.

In the present invention, during the heating process, it is preferable that an end-point temperature of the ingot falls within a range of 400-500° C., and that a heating/holding time of the ingot falls within a range of 1-10 hrs. When the end-point temperature of the ingot exceeds 500° C., or when the heating/holding time exceeds 10 hrs, the Si particles are enlarged in the sacrificial anode material so that it is impossible to obtain more suitable distribution of the Si particles, resulting in deterioration in the corrosion resistance. On the other hand, when the end-point temperature of the ingot is less than 400° C., there may be a case where the core material, the sacrificial anode material and the filler material are not metallically bonded to each other. Also, when the heating/holding time of the ingot is less than 1 hr, there may be a case where the temperature of the composite material is not equalized.

After the composite material undergoes the heating process, it is subjected to the combining/material hot rolling process. In the present invention, it is preferable that a time period of the combining/material hot rolling process is at most 40 min. Also, it is preferable that a temperature of the composite material is at most 300° C. at the end of the combining/material hot rolling process. When the rolling time in the combining/material hot rolling process exceeds 40 min., and/or when the temperature of the composite material exceeds 300° C. at the end of the combining/material hot rolling process, the Si particles are enlarged in the sacrificial anode material so that it is impossible to obtain more suitable distribution of the Si particles, resulting in deterioration in the corrosion resistance. More preferably, the rolling time in the combining/material hot rolling process is 10 min. When the combining/material hot rolling process is carried out over a time period of less than 10 min., there may be a case where it is very difficult to secure a productivity due to the fact that a crack may be caused in the composite material, or the sacrificial anode material and/or the filler material may be peeled from the core material. Note, although a thickness of the composite material at the end of the combining/material hot rolling process is not especially limited, it is ordinarily on the order of 2-10 mm.

Thereafter, the aluminum alloy brazing sheet obtained by the combining/material hot rolling process is further rolled by a cold rolling process until a predetermined thickness is given to the brazing sheet. During the cold rolling process or after the cold rolling process, the brazing sheet may be once or twice subjected to an annealing process. Although the conditions of the cold rolling process and the annealing process are not especially limited, usually, after the brazing sheet is subjected to the annealing process during the cold rolling process, it is rolled at a rolling ratio falling within a range of 5-80% until a predetermined thickness is given to the brazing sheet, so that the brazing sheet exhibits a H1X refining, or after the brazing sheet is rolled until a predetermined thickness is given to the brazing sheet, it is subjected to the annealing process so that the brazing sheet exhibits a H2X refining. Usually, the annealing process is carried out at a temperature falling within a range of 200-500° C. over a time period falling within a range of 1-10 hrs, using an oven of a batch type oven, or the annealing process is carried out at a temperature falling within a range of 200-250° C., using an oven of continuous type.

Although the thickness of the aluminum alloy brazing sheet and the clad ratio of the filler material layer are not especially limited, usually, when the brazing sheet is utilized as a tube member for an intercooler in which an compressed air is circulated by a turbocharger, it may be formed as a thin brazing sheet having a thickness of at most 0.6 mm. Nevertheless, the thickness of the brazing sheet cannot be limited in this range, and it is possible to utilize a relatively thick brazing sheet having a thickness falling within a range between about 0.6 mm and about 5 mm. Usually, the clad ratio of the filler material layer are on the order of 3-20%.

F: Heat Exchanger

With the aluminum alloy brazing sheet according to the present invention, since, in a state in which a heating process for brazing is completed, not only can uniform corrosion deriving from lowness of pH in a corrosion liquid be restrained, but also it is possible to suppress occurrence and development of pitting corrosion deriving from existence of chloride ions in the corrosion liquid, and since the brazing sheet further exhibits a superior strength and a good brazing property, it is possible to suitably utilize the brazing sheet in, for example, an heat exchanger for a lightweight automobile.

F-1: Inner Fin Material

Next, in the case where the aluminum alloy brazing sheet according to the present invention is utilized in a heat exchanger having an inner fin, an issue and ranges of components therefor will be explained.

For the inner fin, a bare fin is utilized. As stated above, when the inner fin have the filler material, in an environment including the exhaust gas condensate water, the Si particles in the filler material serve as cathodes so that a corrosion rate is increased. For this reason, the bare fin exhibiting a superior corrosion property is utilized.

In an aluminum alloy for the inner fin material, a component of Cu is limited to at most 0.1, and a component of Zn is limited to at most 0.5%. Due to the fact that Cu serve as a cathode in the environment including the exhaust gas condensate water, and that Cu causes a grain boundary corrosion so that the corrosion rate is increased, when the content of Cu exceeds 0.1%, a strength of the heat exchanger increasingly deteriorates after the corrosion, resulting in decrease in a pressure resistance strength of the heat exchanger. Due to the fact that Zn facilitates dissolution of aluminum in the environment including the exhaust gas condensate water so that the corrosion rate is increased, when the content of Zn exceeds 0.5%, the strength of the heat exchanger increasingly deteriorates after the corrosion, resulting in decrease in the pressure resistance strength of the heat exchanger. Note, although other components except for Cu and Zn in the inner fin is not especially limited, usually, a purity aluminum-based alloy, an Al/Fe-based alloy or an Al/Mn-based alloy is utilized for the inner fin.

Although the method of manufacturing the heat exchanger according to the present invention is not especially limited, usually, after parts such as tubes, fins, headers and so forth are formed and combined with each other, these elements are heated to a temperature of about 600° C. so as to be brazed to each other, resulting in production of the heat exchanger.

Since the heat exchanger so obtained features not only a superior pressure resistance property, but also a good corrosion resistance, it is possible to exercise an excellent durability in an environment of the heat exchanger for an automobile, in which an exhaust gas passes through a tube.

EXAMPLES

Although the present invention will be further explained in detail based on examples below, the present invention cannot be limited to these examples.

Sacrificial anode material alloys composed of components as shown in Table 1 and core material alloys composed of components as shown in Table 2 were cast by respective DC casting processes, and then each of the cast alloys was machined and finished so that both surfaces thereof were shaved. At this time, the ingots for the sacrificial anode material alloys and the ingots for the core material alloys had a thickness of 500 mm. In each of the casting processes, a cooling rate and a value of Sic/5 are shown in Table 1. Also, in addition to the sacrificial anode materials, for filler materials, JIS 4045 alloys were used, and the sacrificial anode materials and the filler materials were subjected to heating processes and hot rolling processes, respectively, so that each of the materials was rolled so as to have a predetermined thickness. The conditions on the heating processes and the hot rolling processes are shown in Table 3.

TABLE 1

| | Alloy References | Alloy Composition (mass %) | | | | | | | Cooling Rate At Casting Process | |
|---|---|---|---|---|---|---|---|---|---|---|
| | | Si | Zn | Fe | Ti | Zr | Cr | V | Al | V(° C./s) | Sic/5 |
| Examples of Invention | A1 | 2.5 | 2.0 | 0.05 | 0.05 | — | — | — | Balance | 0.7 | 0.5 |
| | A2 | 2.5 | 3.0 | 0.1 | 0.3 | — | — | — | Balance | 0.5 | 0.5 |
| | A3 | 4.5 | 3.8 | 0.2 | — | 0.05 | — | — | Balance | 1.2 | 0.9 |
| | A4 | 4.5 | 2.0 | 0.4 | — | 0.3 | — | — | Balance | 0.9 | 0.9 |
| | A5 | 5.5 | 4.0 | 0.6 | — | — | 0.05 | — | Balance | 1.5 | 1.1 |
| | A6 | 5.5 | 1.0 | 0.8 | — | — | 0.3 | — | Balance | 1.2 | 1.1 |
| | A7 | 6.0 | 5.5 | 1.0 | — | — | — | 0.05 | Balance | 1.5 | 1.2 |
| | A8 | 7.0 | 3.0 | 0.2 | — | — | — | 0.3 | Balance | 1.7 | 1.4 |
| | A9 | 2.5 | 3.5 | 0.2 | 0.1 | 0.1 | — | — | Balance | 0.7 | 0.5 |
| | A10 | 2.5 | 4.5 | 0.2 | — | — | 0.1 | 0.1 | Balance | 0.8 | 0.5 |
| | A11 | 3.5 | 5.0 | 0.2 | — | — | — | — | Balance | 1.0 | 0.7 |
| | A12 | 2.5 | 3.0 | 0.2 | 0.1 | — | — | — | Balance | 0.4 | 0.5 |
| | A13 | 4.5 | 3.0 | 0.2 | — | 0.1 | — | — | Balance | 0.6 | 0.9 |
| | A14 | 6.0 | 3.0 | 0.2 | — | — | 0.1 | — | Balance | 1.1 | 1.2 |
| Comparative Examples | A15 | 7.5 | 3.0 | 0.2 | 0.1 | — | — | — | Balance | 1.6 | 1.5 |
| | A16 | 5.0 | 7.0 | 0.2 | — | — | — | 0.1 | Balance | 1.0 | 1.0 |
| | A17 | 5.0 | 0.5 | 0.2 | 0.1 | 0.1 | — | — | Balance | 1.0 | 1.0 |
| | A18 | 5.0 | 3.0 | 1.1 | — | — | 0.1 | — | Balance | 1.0 | 1.0 |
| | A19 | 2.0 | 3.0 | 0.1 | — | — | — | — | Balance | 0.5 | 0.4 |

TABLE 2

| Alloy References | Alloy Composition (mass %) | | | | | | | | | |
|---|---|---|---|---|---|---|---|---|---|---|
| | Si | Fe | Cu | Mn | Mg | Ti | Zr | Cr | V | Al |
| B1 | 0.8 | 0.2 | 0.4 | 1.5 | — | 0.05 | 0.05 | — | — | Balance |
| B2 | 0.5 | 0.4 | 0.8 | 1.1 | — | — | — | 0.05 | 0.05 | Balance |
| B3 | 0.1 | 0.6 | 0.5 | 0.8 | 0.4 | 0.3 | — | — | — | Balance |
| B4 | 0.6 | 0.8 | 1.0 | 1.1 | — | — | 0.3 | — | — | Balance |
| B5 | 1.0 | 1.0 | 0.5 | 1.8 | — | — | — | — | — | Balance |

TABLE 3

| Process References | Sacrificial Anode Materials | | | Combined Materials | | | |
|---|---|---|---|---|---|---|---|
| | Heating Process | | Hot Rolling Process | Combining/Material | | | |
| | | | Temperature At | Heating Process | | Hot Rolling Process | |
| | Temperature (° C.) | Time (hrs) | End Of Rolling (° C.) | Temperature (° C.) | Time (hrs) | Time (min) | Temperature At End Of Rolling (° C.) |
| C1 | 400 | 2 | 250 | 450 | 2 | 30 | 250 |
| C2 | 500 | 8 | 350 | 500 | 10 | 40 | 300 |
| C3 | 400 | 2 | 250 | 450 | 2 | 10 | 250 |
| C4 | 520 | 2 | 300 | 450 | 2 | 30 | 250 |
| C5 | 400 | 15 | 250 | 450 | 2 | 30 | 250 |
| C6 | 400 | 2 | 450 | 450 | 2 | 30 | 250 |
| C7 | 400 | 2 | 250 | 520 | 2 | 30 | 250 |
| C8 | 400 | 2 | 250 | 450 | 15 | 30 | 250 |
| C9 | 400 | 2 | 250 | 450 | 2 | 50 | 250 |
| C10 | 400 | 2 | 250 | 450 | 2 | 30 | 350 |

With using the alloys, each of the core materials was combined with a sacrificial anode material as shown in Table 2 and either the same sacrificial anode material or a filler material comprising JIS 4045 alloy, so that the sacrificial anode material was applied to one surface of the core material as a cladding 1, and so that either the same sacrificial anode material or the JIS 4045 alloy filler material was applied to the other surface of the core material as a cladding 2, resulting in production of composite materials. Each of the combined composite materials was subjected to a heating process and a combining/material hot rolling process, to thereby produce a 3-play clad material having a thickness of 3.5 mm. Then, the 3-play clad material was subjected to an intermediate annealing process (at a temperature 450° C. over 5 hrs) and a final cold rolling process, so that a plate material exhibiting a H1n refining and having a thickness of 0.5 mm was produced as a sample.

As shown in Table 4, in the examples of the present invention and the comparative examples, the sacrificial anode materials defined as the claddings 1 and shown in Table 1, either the same sacrificial anode material or the JIS 4045 alloy filler materials defined as the claddings 2 and shown in Table 1, the core materials shown in Table 2, and the processes shown in Table 3 were combined.

TABLE 4

| | | Sacrificial Anode Material Alloys (Cladding 1) | Sacrificial Anode Material Alloys Or Brazing Material Alloys (Cladding 2) | Core Material Alloys | Production Process |
|---|---|---|---|---|---|
| Examples Of | 1 | A1 | A1 | B1 | C1 |
| | 2 | A2 | A2 | B2 | C1 |
| Invention | 3 | A3 | A3 | B3 | C1 |
| | 4 | A4 | A4 | B4 | C1 |
| | 5 | A5 | A5 | B5 | C1 |
| | 6 | A6 | A6 | B1 | C1 |
| | 7 | A7 | A7 | B1 | C1 |
| | 8 | A8 | A8 | B1 | C1 |
| | 9 | A9 | A9 | B1 | C1 |
| | 10 | A10 | A10 | B1 | C1 |
| | 11 | A11 | A11 | B1 | C1 |
| | 12 | A12 | A12 | B1 | C1 |
| | 13 | A13 | A13 | B1 | C1 |
| | 14 | A14 | A14 | B1 | C1 |
| Comparative Examples | 15 | A15 | 4045 | B1 | C1 |
| | 16 | A16 | 4045 | B1 | C1 |
| | 17 | A17 | 4045 | B1 | C1 |
| | 18 | A18 | 4045 | B1 | C1 |
| | 19 | A19 | 4045 | B1 | C1 |
| | 20 | A4 | A4 | B4 | C1 |
| | 21 | A4 | A4 | B4 | C1 |
| Examples Of Invention | 22 | A4 | 4045 | B1 | C1 |
| | 23 | A4 | 4045 | B1 | C2 |
| | 24 | A4 | 4045 | B1 | C3 |
| | 25 | A4 | 4045 | B1 | C4 |
| | 26 | A4 | 4045 | B1 | C5 |
| | 27 | A4 | 4045 | B1 | C6 |
| | 28 | A4 | 4045 | B1 | C7 |
| | 29 | A4 | 4045 | B1 | C8 |
| | 30 | A4 | 4045 | B1 | C9 |
| | 31 | A4 | 4045 | B1 | C10 |

G: Evaluation

In the samples produced as sated above, thicknesses of the sacrificial anode materials and thickness of the filler materials were measured, and values of X of the above-mentioned formula (1) were calculated. Also, in each of the sacrificial anode materials, an existence density of Si particles having a projected area diameter of at least 1.0 μm and an existence density of Si particles having a projected area diameter of at least 0.5 μm were measured. Further, each of the samples was subjected to a heating process for brazing, and an average crystallized grain diameter measured thickwise in the sacrificial anode material, a corrosion resistance and a brazing property were evaluated.

G-1: Thickness Measurement of Sacrificial Anode Material and Filler Material

In each of the sample, an L-ST face was exposed by a polishing process, and was etched by a Keller's corrective liquid. Then, thicknesses of the sacrificial anode materials and thicknesses of the JIS 4045 alloy filler materials were measured by observing contrasts based on differences between alloy compositions, using a microscope.

G-2: Measurement of Existence Density of Si Particles

The existence densities of Si particles having the projected area diameter of at least 1.0 μm and the projected area diameter of at least 0.5 μm were measured by observing a cut face of a sacrificial anode material of each of the samples which is etched with the aforesaid Keller's corrective liquid. Note, in the samples in which the respective sacrificial anode materials are applied to both the surfaces of each of the core materials, a cladding 1 was selected as a surface to be measured.

G-3: Measurement of Average Crystallized Grain Diameter after Brazing

After each of the samples was subjected to a heating process for brazing as a plate-like material, an L-ST face was exposed by a polishing process, was anode-oxidized using a barker's corrosive liquid, and was then observed by a microscope through a polarization filter, so that an average crystallized grain diameter was measured thickwise in the sacrificial anode material. The microscope had a 100-power in observation, and a total of crystallized grain diameters in three view fields of the sacrificial anode material was averaged in three view fields. Note, in the samples in which the respective sacrificial anode materials are applied to both the surfaces of each of the core materials, a cladding 1 was selected as a surface to be measured.

G-4: Measurement of Corrosion Resistance

After each of the samples was subjected to a heating process for brazing as a plate-like material, it was cut into sample pieces having a size of 50 mm×50 mm. In each of the pieces, the surface of the cladding 2 was masked with a resin, and the surface of the sacrificial anode material which is cladded as the cladding 1 on the core material was defined as a test surface. For the immersion test, the sample pieces were immersed in the aqueous solutions composed of components as shown in Table 5 at a temperature of 50° C. over a time period of 1,000 hrs. After the immersion test is finished, corrosion products were removed from the sample pieces, using a concentrated nitric acid solution. Then, depths of corrosions produced in the surface of the sacrificial anode material were measured, using a focal depth method, and the maximum depth was defined as a corrosion depth. In evaluation with the aqueous solutions A, B, C and D, when the sample pieces had a corrosion depth of less than 150 μm in all of the aqueous solutions, they were evaluated as being acceptable (○). When the sample pieces had a corrosion depth of at least 150 μm, they were evaluated as being unacceptable (x).

TABLE 5

| | Chloride Ion Density (ppm) | pH |
|---|---|---|
| Aqueous Solution A | 10 | 2.3 |
| Aqueous Solution B | 300 | 1.8 |
| Aqueous Solution C | 2 | 2.3 |
| Aqueous Solution D | 10 | 4.0 |

G-5: Evaluation of Brazing Property

JIS 3003 alloy was corrugated and shaped into a fin, and was combined with the surface of the sacrificial anode material of each of the samples. Then, the combined sample was immersed in an aqueous solution containing 5% fluoride flux, and was subjected to a heating process for brazing at a temperature of 80° C. over a time period of 3 min. In this core sample, when a fin joining rate was at least 95%, and when no melting occurred in the sample, a brazing property was evaluated as being sufficient (○). When a fin joining rate was less than 95%, and when a melting occurred in the sample, a brazing property was evaluated as being insufficient (x).

The results of the measured thicknesses of the sacrificial anode materials, the measured thicknesses of the filler materials, the calculated values of X, the measured existence densities of Si particles having the projected area diameter of at least 1.0 μm and the projected area diameter of at least 0.5 μm in the sacrificial anode materials, the measured average crystallized grain diameters thickwise in the sacrificial anode materials after the brazing, the measured corrosion depths, and the evaluated brazing properties shown in Table 6.

TABLE 6

| | | Sacrificial Anode Material Thickness (μm) <Cladding 1> | Sacrificial Anode Material Thickness Or Brazing Material Thickness (μm) <Cladding 2> | X Value | Density Of Si particles having At Least 1.0 μm (number/mm²) | Density Of Si particles having At Least 5.0 μm (number/mm²) | Average Crystalized Grain Diameter Measured Thickwise In Sacrificial Anode Material (μm) |
|---|---|---|---|---|---|---|---|
| Examples Of Invention | 1 | 60 | 50 | 102 | 2100 | 301 | 58 |
| | 2 | 25 | 51 | 64 | 3200 | 350 | 23 |
| | 3 | 25 | 48 | 62 | 3600 | 362 | 23 |
| | 4 | 42 | 49 | 55 | 2500 | 311 | 39 |
| | 5 | 60 | 50 | 132 | 2700 | 309 | 57 |
| | 6 | 29 | 50 | 16 | 3800 | 364 | 27 |
| | 7 | 52 | 53 | 143 | 2200 | 321 | 48 |
| | 8 | 26 | 53 | 31 | 3200 | 340 | 24 |
| | 9 | 53 | 48 | 158 | 2200 | 304 | 50 |
| | 10 | 80 | 50 | 306 | 2500 | 309 | 76 |
| | 11 | 70 | 52 | 263 | 2100 | 303 | 65 |
| | 12 | 51 | 51 | 130 | 7100 | 580 | 35 |

TABLE 6-continued

|  |  |  |  |  |  |  |  |
|---|---|---|---|---|---|---|---|
|  | 13 | 70 | 52 | 137 | 6300 | 550 | 50 |
|  | 14 | 26 | 53 | 39 | 6900 | 545 | 20 |
| Comparative | 15 | 48 | 50 | 50 | 2900 | 310 | 45 |
| Examples | 16 | 50 | 50 | 210 | 2500 | 320 | 48 |
|  | 17 | 50 | 51 | 15 | 2500 | 311 | 47 |
|  | 18 | 53 | 51 | 95 | 2400 | 310 | 49 |
|  | 19 | 42 | 50 | 113 | 1200 | 300 | 40 |
|  | 20 | 20 | 52 | 26 | 2300 | 308 | 19 |
|  | 21 | 85 | 51 | 111 | 2600 | 323 | 80 |
| Examples Of | 22 | 48 | 51 | 62 | 2500 | 303 | 45 |
| Invention | 23 | 51 | 51 | 66 | 2300 | 307 | 48 |
|  | 24 | 40 | 41 | 52 | 2500 | 316 | 38 |
|  | 25 | 50 | 52 | 65 | 5600 | 411 | 42 |
|  | 26 | 50 | 51 | 65 | 6000 | 423 | 43 |
|  | 27 | 53 | 50 | 69 | 5500 | 441 | 44 |
|  | 28 | 50 | 50 | 65 | 5200 | 417 | 43 |
|  | 29 | 51 | 53 | 66 | 5300 | 419 | 42 |
|  | 30 | 52 | 48 | 68 | 5800 | 426 | 43 |
|  | 31 | 49 | 47 | 64 | 5600 | 429 | 45 |

|  |  | Corrosion Resistance | | | | | |
|---|---|---|---|---|---|---|---|
|  |  | Corrosion Depth (μm) | | | | | |
|  |  | Aqueous Solution A | Aqueous Solution B | Aqueous Solution C | Aqueous Solution D | Evaluation | Brazing Property |
| Examples Of | 1 | 52 | 62 | 42 | 30 | ○ | ○ |
| Invention | 2 | 78 | 85 | 65 | 51 | ○ | ○ |
|  | 3 | 75 | 88 | 63 | 51 | ○ | ○ |
|  | 4 | 60 | 70 | 49 | 51 | ○ | ○ |
|  | 5 | 56 | 68 | 55 | 43 | ○ | ○ |
|  | 6 | 78 | 89 | 70 | 52 | ○ | ○ |
|  | 7 | 51 | 63 | 43 | 32 | ○ | ○ |
|  | 8 | 97 | 92 | 90 | 71 | ○ | ○ |
|  | 9 | 109 | 132 | 100 | 72 | ○ | ○ |
|  | 10 | 108 | 136 | 102 | 73 | ○ | ○ |
|  | 11 | 110 | 131 | 101 | 71 | ○ | ○ |
|  | 12 | 115 | 133 | 100 | 73 | ○ | ○ |
|  | 13 | 112 | 131 | 102 | 70 | ○ | ○ |
|  | 14 | 110 | 133 | 105 | 72 | ○ | ○ |
| Comparative | 15 | 155 | 182 | 130 | 101 | X | ○ |
| Examples | 16 | 163 | 190 | 129 | 109 | X | ○ |
|  | 17 | 158 | 181 | 133 | 113 | X | ○ |
|  | 18 | 159 | 178 | 131 | 111 | X | ○ |
|  | 19 | 51 | 60 | 41 | 32 | ○ | X |
|  | 20 | 100 | 126 | 92 | 78 | ○ | X |
|  | 21 | 53 | 65 | 42 | 48 | ○ | X |
| Examples Of | 22 | 62 | 85 | 55 | 43 | ○ | ○ |
| Invention | 23 | 65 | 86 | 53 | 41 | ○ | ○ |
|  | 24 | 51 | 75 | 43 | 38 | ○ | ○ |
|  | 25 | 114 | 135 | 101 | 71 | ○ | ○ |
|  | 26 | 113 | 138 | 101 | 75 | ○ | ○ |
|  | 27 | 113 | 138 | 102 | 72 | ○ | ○ |
|  | 28 | 112 | 131 | 103 | 73 | ○ | ○ |
|  | 29 | 111 | 134 | 107 | 74 | ○ | ○ |
|  | 30 | 118 | 132 | 101 | 73 | ○ | ○ |
|  | 31 | 115 | 134 | 106 | 72 | ○ | ○ |

Examples 1 to 14, and 22 to 31 of the present invention satisfied the requirements regulated by the present invention, and were acceptable in both the corrosion resistance and the brazing property. Especially, in Examples 1 to 8, and 22 to 24 of the present invention satisfied the formula (1) and the existence densities of Si particles having the projected area diameter of at least 1.0 μm and the projected area diameter of at least 0.5 μm, all of the corrosion depths were less than 100 μm in the corrosion test, and thus these examples were very superior in the corrosion resistance.

Comparative Example 15 deteriorated in the corrosion resistance due to the fact that the Si component was too large in the sacrificial anode material.

Comparative Example 16 deteriorated in the corrosion resistance due to the fact that the Zn component was too large in the sacrificial anode material.

Comparative Example 17 deteriorated in the corrosion resistance due to the fact that the Zn component was too small in the sacrificial anode material.

Comparative Example 18 deteriorated in the corrosion resistance due to the fact that the Fe component was too large in the sacrificial anode material.

Comparative Example 19 deteriorated in the brazing property due to the fact that the Si component was too small in the sacrificial anode material.

Comparative Example 20 deteriorated in the brazing property due to the fact that the thickness of the sacrificial anode material was too thin.

Comparative Example 21 deteriorated in the brazing property due to the fact that the thickness of the sacrificial anode material was too thick.

INDUSTRIAL APPLICABILITY

In the aluminum alloy clad material according to the present invention, not only can the uniform corrosion deriving from the lowness of pH of the corrosion liquid be restrained, but also it is possible to suppress occurrence and development of pitting corrosion deriving from the existence of chloride ions in the corrosion liquid. Thus, for example, the aluminum alloy clad material can be suitably utilized as a corrosion-resistant material for a fluid passage forming member of a heat exchanger for an automobile and so forth.

The invention claimed is:

1. A method of manufacturing a high corrosion-resistant aluminum alloy brazing sheet, wherein the brazing sheet comprises: a core material composed of an aluminum alloy; a sacrificial anode material cladded on one surface of said core material; and a filler material composed of an Al/Si-based alloy and cladded on another surface of said core material, wherein said sacrificial anode material comprises an aluminum alloy which contains Si falling within a range of about 2.5-about 7.0 mass %, Zn falling a range of about 1.0-about 5.5 mass %, Fe falling within a range of about 0.05-about 1.0 mass %, and optionally contains at least one element selected from the group consisting of Ti falling within a range of about 0.05-about 0.3 mass %, Zr falling within a range of about 0.05-about 0.3 mass %, Cr falling within a range of about 0.05-about 0.3 mass %, and V falling within a range of about 0.05-about 0.3 mass %, and further contains the balance Al and the inevitable impurities, and wherein a clad thickness of said sacrificial anode material falling within a range of about 25-about 80 μm, wherein the method comprises the steps of:
casting each of said core material, said sacrificial anode material and selectively said filler material composed of an Al/Si-based alloy, separately from each other;
heating said casted sacrificial anode material and selectively said casted filler material composed of an Al/Si-based alloy, separately from each other; and
hot-rolling said heated sacrificial anode material and selectively said heated filler material composed of an Al/Si-based alloy, separately from each other;
wherein during the casting step of said sacrificial anode material, a cooling rate V (° C./s) for an ingot of said sacrificial anode material and a content Sic of Si satisfies the following formula (2):

$$V \leq Sic/5 \quad (2)$$

wherein in the heating step of said sacrificial anode material, the ingot of said sacrificial anode material is heated and held at a temperature falling within a range of about 300-about 500° C. for a time period falling within a range of about 1-about 10 hrs.; and
wherein in the hot-rolling step of said heated sacrificial anode material, a temperature of said sacrificial anode material is at most 350° C. at an end of the hot rolling process.

2. The method of manufacturing a high corrosion-resistant aluminum alloy brazing sheet according to claim 1, wherein the method further comprises the steps of:
combining said core material, sacrificial anode material and selectively said filler material composed of an Al/Si-based alloy with each other, thereby producing a composite material;
heating an ingot of said composite material;
hot-rolling said heated composite material;
cold-rolling said hot-rolled composite material; and
annealing said composite material during the cold-rolling step or after the cold-rolling step;
wherein in the heating step of said composite material, an ingot of said composite material is heated and held at a temperature falling within about 400 about 500° C. for a time period falling within a range of about 1-about 10 hrs. after the combining step; and
wherein in the hot rolling step of said composite material, a rolling time for rolling said composite material is at most 40 min after the heating step, and in which a temperature of said composite material is at most 300° C. at the end of the hot rolling step.

3. The method of manufacturing a high corrosion-resistant aluminum alloy brazing sheet according to claim 2, wherein an existence density of Si particles having a projected area diameter of at least 1.0 μm is at most 5,000/mm² in a matrix of said sacrificial anode material.

4. The method of manufacturing a high corrosion-resistant aluminum alloy brazing sheet according to claim 3, wherein an existence density of Si particles having a projected area diameter of at least 5.0 μm is at most 500/mm² in the matrix of said sacrificial anode material.

5. The method of manufacturing a high corrosion-resistant aluminum alloy brazing sheet according to claim 4, wherein an average crystallized grain diameter in the thickness direction of said sacrificial anode material is at least 80% of the clad thickness of said sacrificial anode material after the high corrosion-resistant aluminum alloy brazing sheet is heated and brazed.

6. The method of manufacturing a high corrosion-resistant aluminum alloy brazing sheet according to claim 5, wherein the high corrosion-resistant aluminum alloy brazing sheet is utilized as a tube member of a heat exchanger into which an exhaust gas of an automobile flows.

7. The method of manufacturing a high corrosion-resistant aluminum alloy brazing sheet according to claim 6, wherein the high corrosion-resistant aluminum alloy brazing sheet is used in the corrosion environment in which pH is less than pH 3, and in which the density of chloride ions is more than 5 ppm.

8. A method of manufacturing a high corrosion-resistant aluminum alloy brazing sheet, wherein the brazing sheet comprises: a core material composed of an aluminum alloy; and sacrificial anode materials cladded on both surfaces of said core material, respectively; wherein said sacrificial anode material contains an aluminum alloy which contains Si falling within a range of about 2.5-about 7.0 mass %, Zn falling a range of about 1.0-about 5.5 mass %, Fe falling within a range of about 0.05-about 1.0 mass %, and optionally contains at least one element selected from the group consisting of Ti falling within a range of about 0.05-about 0.3 mass %, Zr falling within a range of about 0.05-about 0.3 mass %, Cr falling within a range of about 0.05-about 0.3 mass %, and V falling within a range of about 0.05-about 0.3 mass %, and further contains the balance Al and the inevitable impurities, and wherein a clad thickness of said sacrificial anode material falls within a range of about 25-about 80 μm;
wherein the method comprises the steps of:
casting said core material;
casting said sacrificial anode material to form an ingot of said sacrificial anode material;
heating said ingot of said cast sacrificial anode material to form heated sacrificial anode material; and
hot-rolling said heated sacrificial anode material to form a hot-rolled sacrificial anode material;

wherein during the casting step of said sacrificial anode material, a cooling rate V (° C./s) for an ingot of said sacrificial anode material and a content Sic of Si satisfies the following formula (2):

$$V \leq Sic/5 \tag{2}$$

wherein in the heating step of said ingot of said cast sacrificial anode material, the ingot of said cast sacrificial anode material is heated and held at a temperature falling within a range of about 300-about 500° C. over a time period falling within a range of about 1-about 10 hrs.; and wherein in the hot-rolling step of said heated sacrificial anode material, a temperature of said hot-rolled sacrificial anode material is at most 350° C. at an end of the hot rolling process.

9. The method of manufacturing a high corrosion-resistant aluminum alloy brazing sheet according to claim 8, wherein the method further comprises the steps of:

combining said cast core material and said hot-rolled sacrificial anode material with each other, thereby producing a composite material;

heating said composite material to form heated composite material;

hot-rolling said heated composite material to form hot-rolled composite material;

cold-rolling said hot-rolled composite material; and annealing said composite material during the cold-rolling step or after the cold-rolling step;

wherein in the heating step of said composite material, an ingot of said composite material is heated and held at a temperature falling within about 400-about 500° C. for a time period falling within a range of about 1-about 10 hrs. after the combining step; and wherein in the hot rolling step of said composite material, a rolling time for rolling said composite material is at most 40 min after the heating step, and in which a temperature of said composite material is at most 300° C. at the end of the hot rolling step.

10. The method of manufacturing a high corrosion-resistant aluminum alloy brazing sheet according to claim 9, wherein an existence density of Si particles having a projected area diameter of at least 1.0 μm is at most 5,000/mm² in a matrix of said sacrificial anode material.

11. The method of manufacturing a high corrosion-resistant aluminum alloy brazing sheet according to claim 10, wherein an existence density of Si particles having a projected area diameter of at least 5.0 μm is at most 500/mm² in the matrix of said sacrificial anode material.

12. The method of manufacturing a high corrosion-resistant aluminum alloy brazing sheet according to claim 11, wherein an average crystallized grain diameter in the thickness direction of said sacrificial anode material is at least 80% of the clad thickness of said sacrificial anode material after the high corrosion-resistant aluminum alloy brazing sheet is heated and brazed.

13. The method of manufacturing a high corrosion-resistant aluminum alloy brazing sheet according to claim 12, wherein the high corrosion-resistant aluminum alloy brazing sheet is utilized as a tube member of a heat exchanger into which an exhaust gas of an automobile flows.

14. The method of manufacturing a high corrosion-resistant aluminum alloy brazing sheet according to claim 13, wherein the high corrosion-resistant aluminum alloy brazing sheet is used in the corrosion environment in which pH is less than pH 3, and in which the density of chloride ions is more than 5 ppm.

* * * * *